May 19, 1953 E. S. RITTNER ET AL 2,638,783
RELATIVE HUMIDITY MEASURING APPARATUS
Filed Feb. 8, 1949 3 Sheets-Sheet 1

INVENTORS
EDMUND S. RITTNER
& SAMUEL FINE
BY *[signature]*
AGENT

May 19, 1953 E. S. RITTNER ET AL 2,638,783
RELATIVE HUMIDITY MEASURING APPARATUS
Filed Feb. 8, 1949 3 Sheets-Sheet 2

INVENTORS
EDMUND S. RITTNER
SAMUEL FINE
BY *Fred M. Vogel*
AGENT

May 19, 1953  E. S. RITTNER ET AL  2,638,783
RELATIVE HUMIDITY MEASURING APPARATUS
Filed Feb. 8, 1949  3 Sheets-Sheet 3
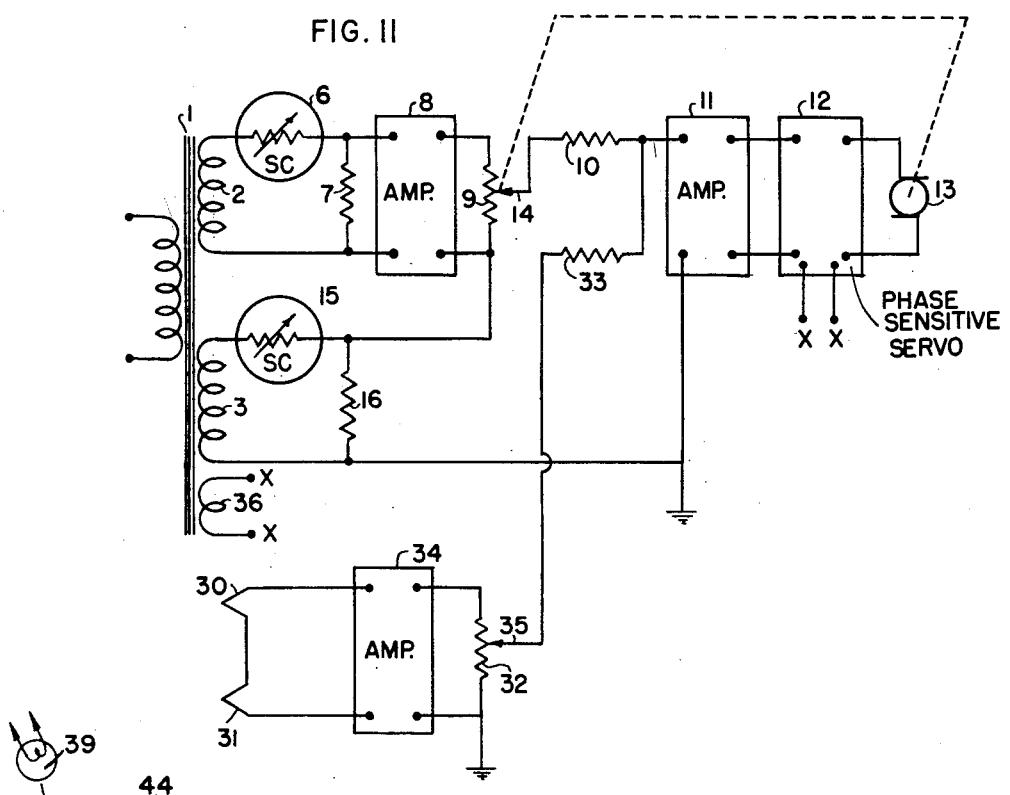
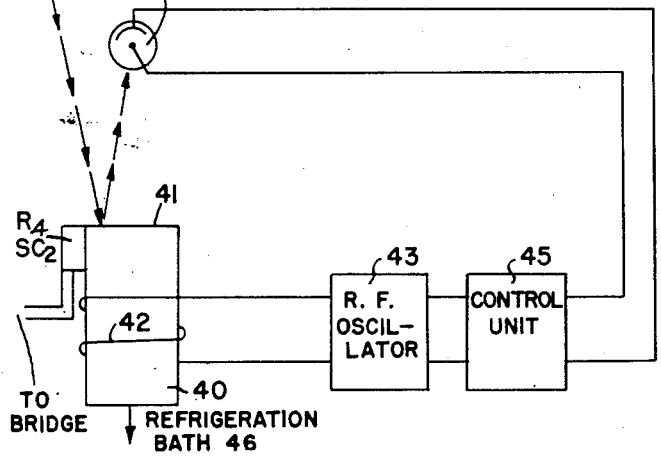
INVENTORS
EDMUND S. RITTNER
SAMUEL FINE
BY Fred M Vogel
AGENT

UNITED STATES PATENT OFFICE 2,638,783

RELATIVE HUMIDITY MEASURING APPARATUS

Edmund S. Rittner, Peekskill, and Samuel Fine, New York, N. Y., assignors to Philips Laboratories, Inc., Irvington-on-Hudson, N. Y.

Application February 8, 1949, Serial No. 75,118

3 Claims. (Cl. 73—338)

Our invention relates to relative humidity measuring apparatus.

In numerous chemical and physical problems, it is often necessary to evaluate exponential functions involving temperature for example, exponential functions of the form $$y = y_0 e^{-\frac{A}{kT}} \quad (1)$$

wherein $y$ is the dependent variable and $T$ is the absolute temperature. The independent parameters $A$ and $y_0$ can also be temperature dependent although in most cases the temperature dependence of $y_0$ is small relative to that of the exponential term.

Exponential functions of the above type arise in such problems as the determination of the equilibrium pressure of a liquid or solid, of the partial pressure of a solvent vapor above a solution, of the equilibrium constant of a chemical reaction, of the specific reaction rate velocity of a chemical reaction, of the absolute humidity of air, and of the relative humidity of air, and in related physical or chemical problems.

It is often desired to obtain solutions of equations of the above type for a large number of assigned temperatures, in which case it is time-consuming and laborious to perform the necessary operations in the solution of the equation by conventional mathematical methods. This is especially the case when the parameter $A$ varies with temperature.

It is therefore an object of our invention to provide a simple computing device which is adapted to yield precise values of the dependent variable in the above-described equation at all assigned values of temperature.

The foregoing object is attained in accordance with the invention by means of a computing device embodying a temperature responsive element whose conductance changes in accordance with the law:

$$\sigma = \sigma_0 e^{-\frac{U}{kT}} \quad (2)$$

In Equation 2, $\sigma$ signifies the conductance, $\sigma_0$ the value of conductance which the substance would exhibit at an infinitely high temperature, $U$ the conduction activation energy of the substance, $T$ the absolute temperature at which the substance is to be maintained, and $k$ a constant which reduces the exponent to a dimensionless number.

Elements having a behavior conforming to Equation 2 may be formed of substances belonging to the general class of semi-conductors and insulators, such as, thallium sulfide, zinc oxide, titanium dioxide, cobalt oxide containing a lithium impurity, nickel oxide containing a lithium impurity, cuprous oxide, and various impurity type semi-conductors described in Belgian Patent No. 475,570. As a further feature of the invention, elements constituted by such semi-conductors and insulators are formed into networks, whereby the value of and temperature dependence of the equivalent conduction activation energy is matched to the value and temperature dependence of the parameter $A$ in Equation 1.

The invention will now be described with reference to the appended drawing wherein.

Figure 10A:
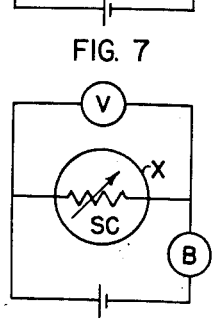
Figure 10:
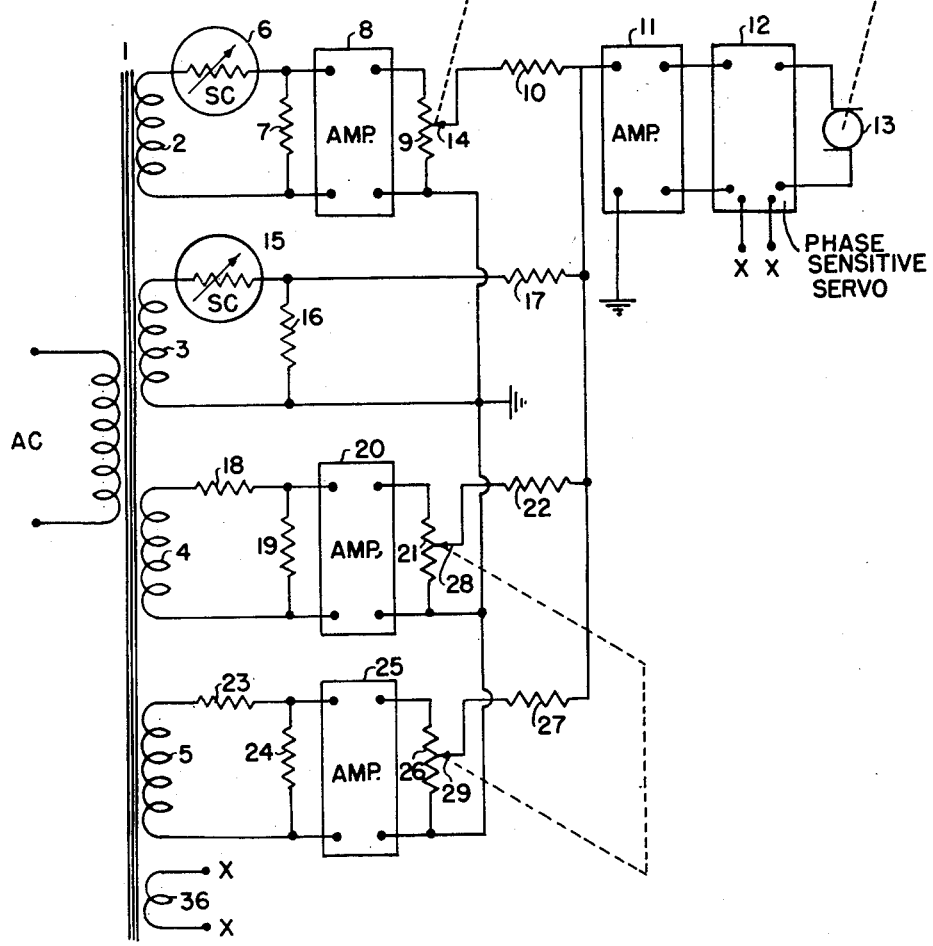

Figures 4 to 9a inclusive illustrate several elementary circuits in accordance with the invention for measuring either the conductance or resistance of elements obeying the said conductivity law;

Figure 10 shows one form of computing device in accordance with the invention for directly determining relative humidity of the atmosphere; and Figure 11 shows another form of computing device in accordance with the invention for directly determining relative humidity of the atmosphere.

Figure 11A:
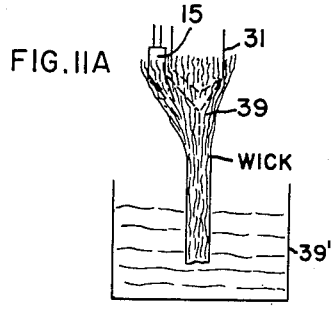

Figures 10A and 11A show details respectively of the Figures 10 and 11 wet bulb measuring means.

Figure 12:
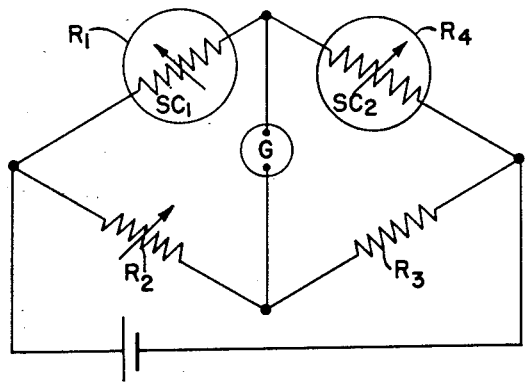

Figures 12 and 13 show basic circuits for measuring relative humidity in accordance with Equation 8.

The invention will be described with particular reference to the determination of both relative and absolute humidities of air. However, it is to be understood that the invention is applicable to other physical or chemical problems and the following description is intended to be illustrative only.

In order to measure the equilibrium pressure of water, reference is had to Clapeyron's equation which after making simplifying assumptions and integrating, can be expressed in the following form:

$$P = P_0 e^{-\frac{Q}{RT}} \quad (3)$$

P being the equilibrium pressure, $P_0$ being the equivalent value of the equilibrium pressure of water at an infinitely high temperature, Q the latent heat of evaporation of water, R the universal gas constant having a value 1.9864 calories per mole per degree centigrade and T the absolute temperature in degrees Kelvin.

Figure 1:
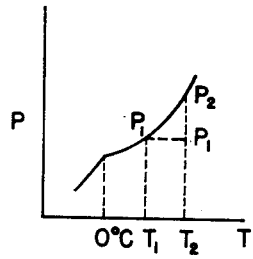
Figure 1 is a graph showing the change in the equilibrium vapor pressure of water as a function of temperature.

The absolute humidity in air is defined as the concentration or partial pressure of water-vapor actually present in the air. Referring to Fig. 1, the curve shows the equilibrium vapor pressure of ice and liquid water as a function of temperature over a range of temperatures extending from below the freezing point to approximately the boiling point of water. This curve also represents substantially the partial pressure of water vapor in air in equilibrium above ice and liquid water as a function of temperature over the same temperature range.

Let the ordinate $P_1$ represent the partial pressure of water vapor (and correspondingly the absolute humidity) in the atmosphere at temperature $T_2$. The equilibrium vapor pressure corresponding to this temperature is then given by the ordinate $P_2$. $P_1$, however, has substantially the same value as the equilibrium pressure of water-vapor at a lower temperature $T_1$, commonly referred to as the dew-point temperature. $P_1$, can be calculated by using Equation 3 as follows:

$$P_1 = P_0 e^{-\frac{Q}{RT_1}} \quad (4)$$

In accordance with the invention the equilibrium partial pressure $P_1$ at the dew-point temperature is determined by measuring the conductance of a semi-conductor having an activation energy equivalent to Q. Thus from Equation 1:

$$\sigma_1 = \sigma_0 e^{-\frac{U}{RT_1}} \quad (5)$$

when U is specified in calories per mole, and hence, $P_1$ is directly proportional to $\sigma$.

The relative humidity H is defined as the ratio of the partial pressure of water in air to the saturation pressure at the same temperature:

$$H = \frac{P_1}{P_2} \quad (6)$$

From Equation 3

$$H = \frac{e^{-Q/RT_1}}{e^{-Q/RT_2}} \quad (7)$$

By measuring $P_1$ at the dew-point temperature and $P_2$ at the ambient temperature, by means of two elements constituted respectively by a semi-conductive substance or substances having appropriate values of U, the relative humidity is measured. More specifically from Equations 2, 3 and 6 we have:

$$H = \frac{e^{-\frac{U}{RT_1}}}{e^{-\frac{U}{RT_2}}} = \frac{\sigma_1}{\sigma_2} \quad (8)$$

It is to be noted that the relative humidity H is simply the ratio of the conductances of the two semi-conductive elements, one maintained at ambient temperature and the other maintained at the dew-point temperature.

A simple apparatus illustrating one method for measuring relative humidity based on Equation 8 is shown in Figs. 12 and 13. The two semiconductive elements $SC_1$, $SC_2$ are connected in opposite arms of a simple bridge circuit (Fig. 12) and constitute resistances $R_1$ and $R_4$, respectively. The other elements of the bridge are constituted by a variable resistance $R_2$ and a fixed resistance $R_3$. A galvanometer G is connected between the junctions of $R_1$ and $R_4$, and $R_2$ and $R_3$. The other two junctions are connected to a suitable source of potential. One of the semi-conductor elements $SC_1$ is maintained at room temperature and the other $SC_2(R_4)$ is maintained at the dew-point temperature.

Fig. 13 shows one arrangement for maintaining $R_4$ at the dew-point temperature. Referring to Fig. 13, the semi-conductive element $R_4$ is in good thermal contact with but insulated electrically from a block of metal 40 having a mirror surface 41. An induction heating coil 42, arranged to be energized by an R. F. oscillator 43, surrounds the upper portion of the block 40. A photoelectric cell 44 is arranged to collect that portion of the light emitted by source 39 which is reflected from the mirror surface 41 of the block 40 and the output of the cell 44 is coupled to a control unit 45, which in turn is coupled to the R. F. oscillator 43. The block of metal 40 is cooled by a refrigeration bath 46. The apparatus is operated by cooling the block 40 and the mirror surface 41 by the bath 46 until a deposit of moisture appears on the mirror surface 41. The light reflected from the mirror surface 41 is decreased in intensity due to this deposit of moisture resulting in a changed output from the photocell which actuates the control unit 45, which in turn increases the power output of the oscillator 43 until the heat lost by conduction to the refrigeration bath 46 through the block 40 just balances the heat input from the oscillator 43. At the balance point, there is no increase or decrease in the thickness of the moisture deposit and the temperature of the block 40 is then at the dew-point temperature. Since $R_4$ is in good thermal contact with the block 40, it too is also at the dewpoint temperature. Variable resistor $R_2$ is then adjusted until the bridge (Fig. 12) balances at which time the galvanometer reads zero, and the relative humidity H is then determined as the ratio of $R_2$ to $R_3$. It is obvious that for convenience, a dial can be attached to $R_2$ for reading H directly. It is further obvious that the setting of $R_2$ can be automatically controlled by replacing galvanometer G by a suitably chosen resistor and by feeding the voltage drop generated across said resistance by flow of unbalance current into a conventional amplifier, the output of which in turn is fed to a simple servomechanism mechanically coupled to the arm of resistor $R_2$, the unbalance current causing the servomechanism to adjust $R_2$ until the bridge balances. Furthermore, the foregoing arrangement can be employed in recording or controlling, as well as indicating relative humidity.

The elements for measuring either absolute humidity or relative humidity of air are constituted by semi-conductive materials which have activation energies corresponding to the latent heat of evaporation of liquid water, or of ice when the equilibrium or partial pressure of water-vapor above ice is desired. Suitable elements for the purpose of the invention may be formed, for example, by semi-conductive substances and insulators as follows. An element of thallium sulfide having an activation energy between 0.41 and 0.79 electron volts is prepared as described by von Hippel, Chesley, Denmark, Ulin and Rittner in the Journal of Chemical Physics, vol. 14, page 361 (1946). An element of zinc oxide having an activation energy between 0.01 and 0.6 of electron volts is prepared as described by Mott and Guerney in "Electronic Processes in Ionic Crystals," Oxford University Press, 1940, page 165. An element of cuprous oxide is prepared with an activation energy between 0.06 and 0.6 electron volt as described in Seitz in "Modern Theory of Solids," McGraw-Hill, N. Y., 1940, page 65. An element of titanium dioxide having an activation energy between .027 and 1.65 electron volts is prepared as described by W. Meyer in "Zeitschrift für Technische Physik," vol. 16, page 358 (1935).

Since the latent heat of evaporation of liquid water is 10,730 calories per mole (0.466 e. v.) at 0° C. and varies monotonically with temperature to 9740 calories per mole at 100° C. (0.423 e. v.) and since the latent heat of evaporation of ice is substantially 12,200 cal/mole between −80 and 0° C., elements constituted by semi-conductive substances prepared in accordance with any of the methods referred to above, as well as a great many others, are suitable for approximating the equilibrium partial pressure curve of water in air. However, in order to obtain even more accurate results, it is desirable that an element constituted by a semi-conductive substance having an activation energy which varies with temperature in close approximation to the dependence of the latent heat of evaporation of water with temperature be employed.

Figure 2:
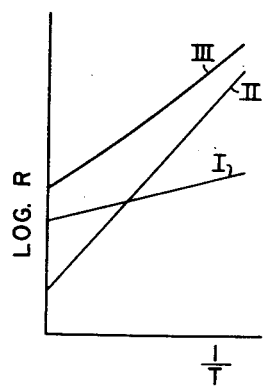
Figure 2 is a graph showing typical curves of the resistance of elements obeying the conductivity law above pointed out and of these elements connected in series combination.
Figure 3:
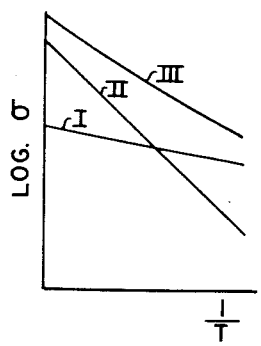
Figure 3 is a graph showing typical characteristics of elements having a conductance obeying the said conductivity law and of these elements connected in parallel combination.

For this purpose, reference is now made to Figures 2 and 3. If Equation 2 is inverted, the reciprocal of conductance is obtained as a function of an exponential equation. Since the reciprocal of conductance is resistance, we have:

$$R = R_0 e^{+\frac{U}{kT}} \qquad (9)$$

In Fig. 2 the variation of the logarithm of the resistance of the material is plotted against values of the reciprocal of the absolute temperature. The slope of the curve, it will readily be seen by taking the logarithms of both sides of Equation 9 is the value of the parameter $U/k$.

Curve I shows a constant slope when values of the logarithm of R, the resistance of one element constituted by a semi-conductive substance or insulator, are plotted against the reciprocal values of temperature. Curve II shows a constant slope when values of the logarithm of R, the resistance of a second element constituted by a semi-conductive substance or insulator are plotted against reciprocal values of temperature. Curve III, however, represents the values of the logarithm of total R plotted against reciprocal values of temperature when the first and second elements are connected in series. It will now be seen that the slope of curve III changes with temperature so that the equivalent activation energy of the combination of two such elements constituted by either semi-conductors or insulators when connected in series varies with temperature.

Fig. 3 shows the same effect when the elements are connected in parallel with the exception that in this case values of the logarithm of total conductance $\sigma$ are more conveniently plotted.

For example, it is desired to obtain an element according to the invention constituted by one or more semi-conductive substances having an equivalent activation energy varying with temperature which closely approximates the variation of the latent heat of evaporation of liquid water with temperature. An element of thallium sulfide is first prepared with an activation energy of 11,730 per mole (0.510 e. v.). An element of titanium dioxide is likewise prepared with an activation energy of 8830 calories per mole (0.394 e. v.). The titanium dioxide element and the thallium sulfide element are given resistance values whereby the ratio of the resistance of the former to the latter is 110.6. The two elements are then connected in series and the equivalent activation energy of the combination will closely approximate the change in latent heat of evaporation of water with temperature as follows:

| T° C. | 0 | 25 | 50 | 75 | 100 |
|---|---|---|---|---|---|
| U cal/mole | 10,730 | 10,420 | 10,146 | 9,918 | 9,734 |
| Q cal/mole | 10,730 | 10,490 | 10,250 | 9,995 | 9,740 |

While this is a particular example of the manner in which an element according to the invention can be constructed for the purpose of closely matching the equilibrium partial pressure curve of water in air, it is to be understood that elements constituted by several semi-conductive substances or even insulators can be formed to attain an even closer approximation of the equilibrium partial pressure curve of water in air. In particular, it has been found desirable to employ a particularly useful expedient for determining the partial pressure of water above both liquid water and ice. Two separate elements having equivalent activation energies corresponding to the latent heat of evaporation of liquid water and the latent heat of sublimation of ice with means to change from one to the other at any desired temperature are employed to determine the partial pressure of water above ice, above liquid water, and even above supercooled water.

A further, and particular example of an element according to the invention, is a substance with an activation energy having a temperature dependence closely corresponding to the temperature dependence of the latent heat of evaporation of liquid water, whereby the conductance of this element gives an almost exact indication of the partial pressure of water in air at any temperature between 0° and 100° C. In fact, when this element according to the invention is employed to measure absolute humidity, values of absolute humidity within 3% of that obtained with a conventional dew-point apparatus have been observed. Similarly, relative humidity values of only 1 to 3% from those obtained with the use of a conventional sling psychrometer have been observed.

Such an element is prepared by mixing approximately 126 grams of $NiCO_3$ and 0.41 grams of $Li_2CO_3$, grinding the mixture, heating in air to 500° C. for two hours, molding the mixture into a rod and subsequently sintering at 1200° C. for two hours. Terminals are applied to the ends of the rod by heating the ends, applying a ceramic silver paste, reheating the ends to burn off organic matter followed by careful reheating until a while silver layer results at the ends of the rod. This silver layer is tinned and a copper wire soldered thereto.

Figure 4:
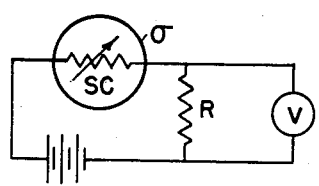

In making determinations of absolute or relative humidity of air, the partial pressure of a solvent vapor over a solution, specific reaction rate velocities and the like, the conductance or resistance of elements constituted by semi-conductive substances or insulators is determined as illustrated in Figures 4 to 9a. In Fig. 4, the conductance $\sigma$ of the element SC which is constituted by a semi-conductive substance or an insulator is conveniently measured by measuring the potential drop with a voltmeter V across a fixed resistor R having a resistance very much smaller than the reciprocal of $\sigma$.

Figure 5:
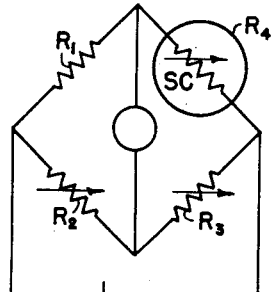

In Fig. 5, either the conductance or resistance of an element $R_4$ constituted by a semi-conductive substance or an insulator SC can be measured with a conventional bridge circuit having resistance elements $R_1$, $R_2$ and $R_3$. To measure the resistance of $R_4$, resistor $R_3$ is made variable and the bridge balanced, since $R_4$ is directly proportional to $R_3$. To measure the conductance of $R_4$, $R_2$ is made variable and the bridge balanced, since the conductance $1/R_4$ is directly proportional to $R_2$.

Figure 6:
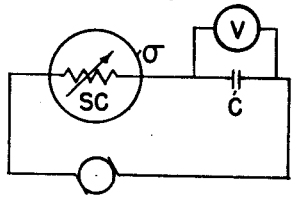

In Fig. 6, the element SC constituted by a semi-conductive substance or an insulator is connected in series with a source of A.-C. potential and a capacitor C of much lower impedance than the reciprocal of $\sigma$, so that the potential measured across the capacitor is directly proportional to the conductance $\sigma$ of SC. This circuit is also useful for controlling auxiliary equipment since the time-constant and hence the natural damping frequency of this circuit will be governed by the value of conductance of SC.

Figure 7:
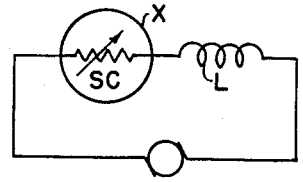

Fig. 7 shows a simple circuit for measuring the resistance X of an element SC constituted by a semi-conductive substance or an insulator by connecting it in series with a battery and an ammeter A calibrated to read in units of resistance.

Figure 8:
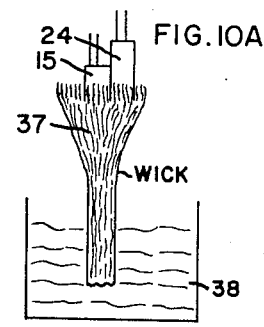

Fig. 8 shows a simple circuit for measuring the resistance X of an element SC constituted by a semi-conductive substance or an insulator by measuring the potential drop thereacross when the SC is connected in series with a constant current barretter B and a battery.

Figures 9, 9A:
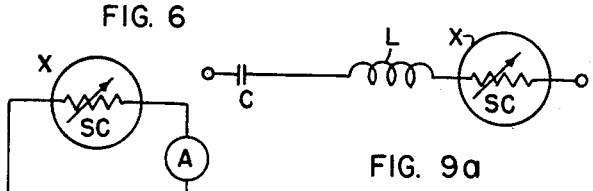

Fig. 9 shows a simple circuit for measuring the resistance of an element SC constituted by a semi-conductive substance or an insulator by means of a series inductance L of much lower impedance than the reciprocal of the conductance. In this case, the potential developed across the inductance with alternating current flowing through the series combination is directly proportional to the value of the resistance of the semi-conductor.

Fig. 9a shows one variant of a simple resonant circuit in which the element SC constituted by a semi-conductive substance or insulator controls the damping of the series combination of inductance L and capacitor C to thereby control auxiliary circuits.

In addition to the dew-point method previously described, psychrometric methods are advantageously employed in measurements of relative humidity. In order to employ the semi-conductors hereinbefore described as elements of a psychrometer for making rapid and automatic determinations of relative humidity, the elements according to the invention are preferably employed in special computing networks such as those illustrated in Figs. 10 and 11 and about to be described.

It can be shown, both theoretically and empirically that the relative humidity of air can be expressed as follows:

$$H = \frac{P_1 - BC(T_2 - T_1)}{P_2} \qquad (10)$$

where $T_2$ is the dry bulb temperature, $T_1$ is the wet bulb temperature (which temperature is higher than the dew-point temperature), $P_2$ is the equilibrium water-vapor pressure at the dry-bulb temperature, $P_1$ is the equilibrium water-vapor pressure at the wet bulb temperature, B is the barometric pressure and C is a constant term.

The wet and dry bulb temperatures are easily attained as is well known to those skilled in the art. Quantities proportional to the equilibrium vapor pressures are obtained by means of the elements according to the invention as described hereinbefore. This information plus the barometric pressure is supplied to an electrical computing network about to be described and the relative humidity is automatically indicated and/or recorded. Moreover by means of servo-mechanisms not illustrated, auxiliary equipment, for example air-conditioning apparatus, can be controlled to maintain a precise desired value of relative humidity.

The electrical computing network about to be described is the analogue of Equation 10 rearranged as follows:

$$P_2H - P_1 + BC(T_2 - T_1) = 0 \qquad (11)$$

Referring to Fig. 10, the computer is connected through a transformer, generally designated 1, having a plurality of secondary windings 2, 3, 4 and 5 and 36. Commencing with secondary winding 2, an element 6, constituted by a semi-conductive substance or substances, is maintained at a dry-bulb temperature and connected in series with a fixed resistance 7, the output of which is supplied to an amplifier 8. The output of the latter is applied to a potentiometer 9, thence through a resistance 10 to an amplifier 11, a phase-sensitive servo-amplifier 12 and a motor 13 which is arranged to drive the movable arm 14 of the potentiometer 9. Secondary winding 3 is connected in series with a second element 15, constituted by a semi-conductive substance or substances, maintained at the wet-bulb temperature and a fixed resistance 16, the output of which is supplied through resistor 17 to amplifier 11.

Secondary winding 4 is connected in series with a barretter 18, and a temperature sensitive resistance 19 for measuring the dry bulb temperature; the value of the resistance of 19 is directly proportional to the absolute temperature. The output of 19 is coupled to an amplifier 20. The output of the latter is coupled through potentiometer 21, the position of which is proportional to the barometric pressure, and resistor 22 to amplifier 11.

Secondary winding 5 is connected in series with a barretter 23, and a temperature sensitive resistance 24, the output of which is proportional to the absolute temperature, for measuring the wet-bulb temperature. The output of resistance 24 is coupled to an amplifier 25, the output of the latter being coupled through potentiometer 26, which is mechanically coupled to potentiometer 21, and resistor 27 to amplifier 11.

The setting of potentiometers 21 and 26 can be accomplished either manually, or automatically by a pressure sensitive electric indicator and a servo-mechanism.

As will readily be seen, the input to amplifier 11 in terms of voltages corresponds to the sum of the terms on the left of Equation 11. If this input is not equal to zero, a voltage is applied to servo 12 which compares this voltage with a reference voltage obtained from secondary winding 36 on the transformer and senses the phase of the voltage supplied by amplifier 11. Servo 12 operates motor 13 to move arm 14 until the input to amplifier 11 is zero. The final setting of arm 14 is a direct measure of the relative humidity and can also be coupled through other servo-mechanisms to auxiliary equipment. Fig. 10A shows the well-known means for maintaining the semi-conductor element 15 and the resistor 24 at the wet-bulb temperature by simply inserting both the element 15 and the resistor 24 in a wick 37 having one end immersed in a pool of water 38 and conducting a stream of air thereover.

Fig. 11 shows one possible variation of the device shown in Fig. 10. In this figure, the reference numerals which are the same as those in Fig. 10 indicate identical or similar components. In this circuit arrangement, however, thermocouples 30 and 31 are employed to obtain the difference in temperature between the dry-bulb and the wet-bulb temperatures. The output of the thermocouples is applied to an amplifier 34. The output of the latter is coupled through potentiometer 32, provided with an adjustable arm for adjusting the potentiometer to include a calibration for barometric pressure, and resistor 33 to amplifier 11. Fig. 11A shows a device similar to that shown in Fig. 10A for maintaining the thermocouple 31 and the semi-conductor 15 at the wet-bulb temperature by inserting them in a wet wick 39 supplied by a pool of water 39' and conducting a stream of air thereover.

Obviously, these circuits are capable of many modifications without affecting their basic character or in affecting the basic principle of the invention which has been just described.

While numerous examples of the substances employed have been given, numerous applications have been indicated, and numerous manners in and circuit arrangements have been described for applying the invention into practice, it is of course recognized that the number of modifications are legion and it would be impossible to describe all of these modifications. It is therefore our desire that the invention described herein be construed as liberally as possible in view of the prior art.

What we claim is:

1. A device for measuring relative humidity in air comprising first and second semi-conductors each having a conductance $\sigma$ conforming to the relationship $$\sigma = \sigma_0 e^{\frac{-U}{kT}}$$

where $\sigma_0$ is the conductance of the semi-conductor at an infinite temperature, U is the activation energy of the semi-conductor and has a value equivalent to the latent heat of evaporation of water at a given temperature, $k$ is a constant having the same units as U per degree of temperature, and T is the absolute temperature, means to maintain the first semi-conductor at the ambient temperature of air, means to maintain the second semi-conductor at the dew-point temperature of air, and means to measure the ratio of the conductances of the two semi-conductors to thereby obtain a quantitative determination of the relative humidity of the air.

2. A device for measuring relative humidity in air comprising first and second semi-conductors each having a conductance $\sigma$ conforming to the relationship $$\sigma = \sigma_0 e^{\frac{-U}{kT}}$$

$\sigma_0$ being the conductance of the semi-conductor at an infinite temperature, U being the activation energy of the semi-conductor and having a value equivalent to the latent heat of evaporation of water at a given temperature, $k$ being constant with the same units as U per degree of temperature, and T being the absolute temperature, means to maintain the first semi-conductor at the ambient temperature, means to maintain the second semi-conductor at a temperature corresponding to a wet-bulb, means to measure the ambient and wet-bulb temperatures, and calculating means coupled to said semi-conductors and said temperature measuring means capable of solving the equation $$\frac{P_1 - BC(T_2 - T_1)}{P_2}$$

the values of $P_1$ and $P_2$ corresponding to the values of conductance of the first and second semi-conductors, respectively, $T_1$ and $T_2$ being the ambient and wet-bulb temperatures, respectively, B being the barometric pressure and C a constant factor.

3. A device for measuring the relative humidity in air as claimed in claim 2 in which the calculating means is an analogue computing network capable of solving the equation $$\frac{P_1 - BC(T_2 - T_1)}{P_2}$$

the values of $P_1$ and $P_2$ corresponding to the values of conductance of the first and second semi-conductors, respectively, $T_1$ and $T_2$ being the ambient and wet-bulb temperatures respectively, B being the barometric pressure and C a constant factor.

EDMUND S. RITTNER.
SAMUEL FINE.

References Cited in the file of this patent

UNITED STATES PATENTS

| Number | Name | Date |
|---|---|---|
| 1,956,386 | Gruss | Apr. 24, 1934 |
| 2,016,660 | Weeks | Oct. 8, 1935 |
| 2,098,650 | Stein | Nov. 9, 1937 |
| 2,349,860 | Hainer | May 30, 1944 |

FOREIGN PATENTS

| Number | Country | Date |
|---|---|---|
| 558,299 | Great Britain | Dec. 30, 1943 |